June 1, 1965  R. M. WILCOX  3,186,774
HYDROSTATIC GAS BEARINGS
Filed Sept. 4, 1962  3 Sheets-Sheet 1

Inventor
ROY M. WILCOX
by: Douglas S. Johnson
Attorney

June 1, 1965  R. M. WILCOX  3,186,774

HYDROSTATIC GAS BEARINGS

Filed Sept. 4, 1962  3 Sheets-Sheet 2

Inventor
ROY M. WILCOX by: Douglas S. Johnson

Attorney

*Inventor*
ROY M. WILCOX by: *Douglas S. Johnson*

*Attorney*

United States Patent Office 3,186,774
Patented June 1, 1965

3,186,774
HYDROSTATIC GAS BEARINGS
Roy M. Wilcox, 2803 Locust Lane, South Bend, Ind.
Filed Sept. 4, 1962, Ser. No. 221,176
8 Claims. (Cl. 308—5)

This invention relates to improvements in compressed gas or air bearings.

As discussed in my United States Patents Nos. 2,683,635 and 2,683,636, granted July 13, 1954, in order to prevent vibration in a compressed gas or air bearing, there must be a limited volume of gas or air in communication with the lubricating gas or air film. There is also discussed in the said patents the requirement for a restriction between the lubricating compressed gas or air film and the compressed gas source, as well as, of course, the gas flow restriction afforded by the edges of the bearing and variable with varying surface separation. The first-mentioned restriction is essential in order to effect a reduction of the pressure in the lubricating film as the bearing surfaces separate to provide a self-regulating effect for locating, orienting, or centering the one bearing surface in respect to the other.

As pointed out in the said patents, this restriction between the pressure source and the film has upper and lower limits. It must permit sufficient flow to the film to provide pressure in the film, yet it must be sufficiently restricting to prevent vibration.

This invention is concerned with the provision in compressed gas or air, hereinafter called gas, bearings of a restricting gas flow formation between the supply source and the film which restriction will provide optimum distribution of the compressed gas throughout the film providing maximum film pressure under loading consistent with maintaining the bearing free from vibration.

In addition to providing an air restricting flow formation having the above characteristics, it is another object of the invention to provide such a formation which will be adaptable to a large variety of gas bearings and will enable bearings to be constructed in a large variety of simple geometric forms.

That is, another important object is to provide a restricting gas flow formation as aforesaid which will lend itself to practical manufacture. In this connection it is an important aspect of the invention to provide a gas flow restricting formation which can be readily serviced to maintain it free from plugging, or if plugged, can be readily dismantled, cleaned and reassembled without requiring any resurfacing of the bearing itself or without disturbing in any way the accuracy of the bearing.

The principal feature of the invention resides in the arrangement and dimensioning of the restricted gas flow passage formation leading to the lubricating gas film. In general, according to the invention, the restricted gas flow passage formation is so arranged as to introduce the pressure gas to the lubricating film, generally along a line or lines, preferably extending parallel to the perimeter of the bearing.

In the preferred form of the invention, the restricted gas flow passage formation is formed by the combination of parts which can be readily assembled and disassembled for ease of manufacture and servicing. In this connection, according to one embodiment of the invention, the restricted flow passage to the lubricating film comprises a slot, or slots, either continuous or interrupted, which is formed by the abutting of a pair of separable bearing members. With this arrangement, the bearing members may be assembled and then surfaced to provide the desired surface accuracy in the bearing. The bearing parts may then be diassembled to remove from the slot the burr which results from the surfacing operation whereby the bearing, on reassembly, provides both the accurate bearing surface and the requisite flow passage formation. According to another embodiment of the invention, the restricting gas flow formation is incorporated into the bearing surface by means of plugs which may be formed separately from the remainder of the bearing surface.

In each particular bearing construction the restricting gas flow passage formation has imposed thereon dimensional limitations which will sufficiently isolate the film from the source to preclude bearing vibration, yet will provide the maximum film pressure under load.

These and other objects and features of the invention will become apparent from the following description taken in conjunction with the accompanying drawings, in which.

Figure 1:
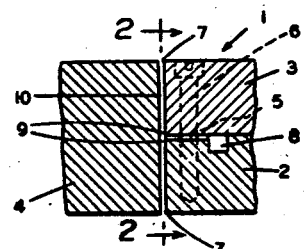
FIGURE 1 is a fragmentary vertical cross-sectional view of one form of bearing constructed in accordance with the invention.

The major problem encountered with gas bearings has been one of vibration. That is, the problem has been to produce a practical bearing which will support a load and from which vibration will be eliminated in operation.

It will be understood that in a gas bearing the lubricating gas film constitutes an elastic medium, and this film is supported or maintained by pressure gas flow through the restriction, hereinafter called the $R_1$ restriction, between the pressure gas source and the film. The pressure gas escapes from the bearing to the atmosphere at the bearing perimeter and the passage or restriction, hereinafter called the $R_2$ restriction, through which the pressure gas escapes is dependent on the separation of the bearing members, that is film thickness, which of course varies under bearing loading.

The basic requirement for stability against vibration in anything as elastic as a gas film is that damping due to fluid friction, plus in special cases damping external to the lubricating film, shall exceed the vibration energy generated by the dissipation of the supply energy through the bearing by hysteresis, including resonant vibration energy imposed on the bearing from outside. That is, whether or not each cycle is slightly decreased or increased in amplitude by net subtraction or addition of energy determines whether or not there will be any sustained vibration.

Resistance to flow through a gas bearing should be viscous rather than inertial so that flow is laminar rather than turbulent, the latter being one type of random fluid vibration or hissing noise. Whether or not flow is turbulent depends on Reynold's number which is proportional to the product of velocity, and hydraulic radius which in thin films is essentially the same as film thickness. Velocity depends on film thickness cubed which depends on the $R_1$ restriction and load.

However the type of gas bearing vibration that has significant amplitude is harmonic, and usually in the audio frequency range. It would appear that this vibration is longitudinal pressure oscillation in the load carrying film in the direction of gas flow, and this oscillation results in film thickness vibration, that is, bearing member vibration.

At any instant there is elastic pressure gas contained by the bearing surfaces between the $R_1$ and $R_2$ restrictions, the $R_2$ restriction vibrating as mentioned above. This elastic medium either in combination with its own mass and the mass of the moving bearing member and attachments, form the oscillating couple which determines frequency. The energy to keep this couple vibrating is supplied by the pressure gas source by means of hysteresis. This phenomenon is associated with the dissipation of the supply energy in the bearing and is caused by a slight time delay or out of phase relationship between the film pressure and bearing displacement. This time delay is the time required for the high pressure elastic mass in the central portion of the film to come in through the $R_1$ restriction or to escape at the edge of the bearing upon change in bearing spacing.

The above-mentioned oscillating mass of gas creates more violent pressure changes as average film velocity increases in cubed proportion to the film thickness. Furthermore, as gas volume, that is film thickness, is decreased, the time delay is lessened thereby reducing hysteresis energy. This desirable reduction in film thickness is achieved by increasing the $R_1$ restriction until oscillation ceases.

As explained above, damping due to fluid friction serves to dissipate vibration energy and this frictional damping in thin films depends on film thinness cubed. The $R_1$ restriction serves as a means of regulating the thinness of the film.

In addition, the high pressure gradient in a gas bearing makes a very thin film necessary to avoid vibration, and again the importance of the $R_1$ restriction for regulating film thinness becomes important.

Figure 2:
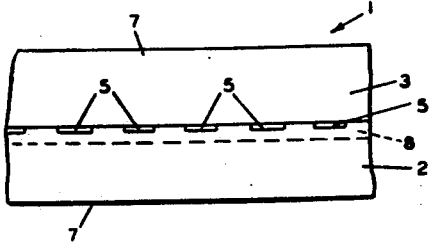
FIGURE 2 is a view taken on the line 2—2 of FIGURE 1.

In the bearing of FIGURE 1 and FIGURE 2, one of the bearing members, generally designated at 1, is formed of two component parts 2 and 3, while the opposing bearing member 4 may comprise a solid part. One of the components 2 of the bearing member 1 is formed with recesses 5 in the face thereof, which abuts the component 3, so that on assembly of the components, by means of suitable screws 6, there is formed centrally of the bearing member 1 a slot formation formed by the recesses 5 which extends linearly and centrally of the bearing midway between the edges 7.

The component 2 is also formed with a longitudinal groove 8 which on assembly of the components 2 and 3 forms a supply passage adapted to be connected to a source of compressed gas. The slots 5 formed on assembly of the components 2 and 3 afford a restricted gas flow passage formation leading from the supply passage 8 to between the bearing members 1 and 4 to supply pressure gas to support a lubricating gas film between the opposing parallel surfaces of the bearing. Preferably, the edges of the slots 5 are slightly rounded as at 9 to reduce turbulence.

The slots 5 thus form a central linear feed midway between the bearing edges so as to provide essentially uniform supply pressure in the centre of the lubricating film 10 lengthwise of the bearing under heavy load. While the slots 5 form, in effect, a linear interrupted slot formation, this slot formation may also be continuous if desired, provided that in either case the dimensions of the slot be such as to restrict gas flow to the film 10 sufficiently to provide in the film a fluid friction exceeding vibration energy generated by dissipation of the gas energy in flowing between the bearing members 1 and 4. For example, the restriction afforded by the slot formation should be such as to provide a film thickness at half load of the order of $4 \times 10^{-4}$ inches, which film thickness will insure the requisite fluid friction to avoid vibration.

The thickness of the slot formation lateral of gas flow to provide such suitable film in a practical bearing may, for instance, be of the order of $2.7 \times 10^{-4}$ inches.

Since resistance to flow in such thin films corresponding to the film 10 is purely viscous, and flow is laminar, the resistance to gas flow is inversely proportional to film thickness cubed, and flow is therefore low in velocity and small in quantity. At light load, most of the pressure drop is in the slot formation, so that film pressure is low even though the film thickness may only have increased, say $5 \times 10^{-4}$ inches.

The load factor, that is, the maximum load which the bearing can support, divided by the product of supply pressure and bearing area with the type of bearing illustrated in FIGURES 1 and 2, is approximately 0.5.

While the dimensions given above with respect to the central uniform linear feed bearing of FIGURES 1 and 2 are specific for a highly satisfactory bearing, it has been found that the $R_1$ restriction afforded by the slot formation may be such as to allow a thickness of the film 10 at half bearing load up to $1.6 \times 10^{-3}$ inches, although it is preferred to keep the upper limit of the film thickness at $8 \times 10^{-4}$ inches to eliminate all problems of vibration from this source. It will be understood that with the bearing surfaces of the bearing members 1 and 4 parallel, there will be no pockets in which gas storage may occur to provide vibration due to this source.

As pointed out above, the slot formation may comprise an interrupted or continuous slot, or it may comprise a multiple slot formation such as described in detail below in connection with FIGURES 3 and 4. Again, if the restriction afforded by the slot is such as to limit the film thickness at half load to the limits given above, then vibration from this source will be avoided.

To produce such film thickness, the restriction afforded by the slot must be such that the resistance to volume flow through the slot must have a minimum value. In terms of the thickness $t_s$ of the slot 5, the perimeter of the load carrying gas film $p$, the depth of the slot in the direction of flow $x$, and the total length of the slot or slots lateral to flow $w$, the slot $R_1$ resistance factor is as follows:

$$R_{1s} = \frac{px}{wt_s^3}$$

where all dimensions are in inches.

When $R_{1s}$ exceeds approximately $2 \times 10^7$ in a slot bearing, the requisite restriction is afforded to limit film thickness as above described, so that the fluid friction in the film exceeds the vibration energy generated by the dissipation of the gas energy flowing between the bearing members.

Figure 3:
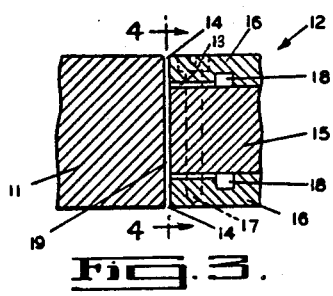
FIGURE 3 is a view similar to FIGURE 1, but showing the invention applied to a slightly different form of bearing.
Figure 4:
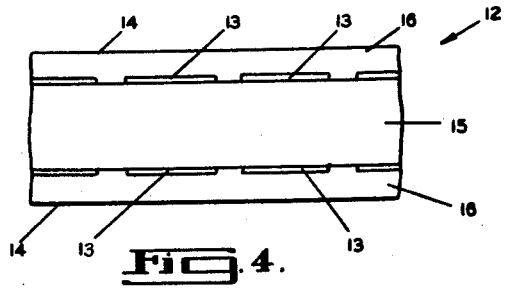
FIGURE 4 is a view taken on the line 4—4 of FIGURE 3.

In FIGURES 3 and 4, the slot formation for delivering compressed gas to between the bearing members 11 and 12 comprises a pair of linear interrupted slot formations comprised by the aligned slots 13, which extend parallel to each other and to the bearing edges 14. Again, these slots are formed by having the bearing member 12 formed of component parts comprising a central member 15 and side members 16 having recesses or grooves therein, which on assembly with the central member form the slots 13. Suitable assembly screws 17 are provided and the side members 16 are also grooved as at 18 to form supply passages in communication with the slots 13, which supply passages are adapted to be connected to a source of compressed gas.

It will be seen that the slot bearing of FIGURES 3 and 4 has the slot formations bordering the bearing's perimeter so as to provide a large area of load-carrying film between the parallel slots, which film will be at essentially supplied pressure when the film thickness approaches zero under heavy load. This peripheral feed and high concentration of pressure air in the film 19 requires that the load-carrying film be very thin to provide sufficient viscous damping to avoid vibration. However, this restriction on gas flow through the bearing is compensated for by the shorter flow path from slot to film edge, so that the slot restriction to avoid vibration is approximately the same as the restriction discussed above in connection with FIGURES 1 and 2.

With a bearing construction such as shown in FIGURES 3 and 4, the load factor is somewhat higher than the load factor of the bearings of FIGURES 1 and 2, and may approach approximately 0.8.

Figure 5:
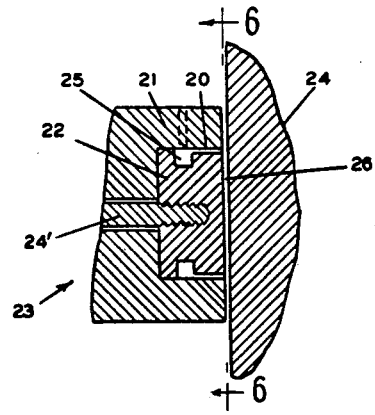
FIGURE 5 is a fragmentary, vertical sectional view of a bearing constructed in accordance with the further embodiment of the invention.
Figure 6:
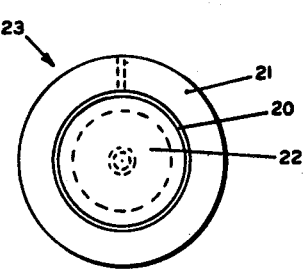
FIGURE 6 is a view taken on the line 6—6 of FIGURE 5.

The bearing illustrated in FIGURES 5 and 6 is similar to the bearing of FIGURES 3 and 4, except that the slot formation 20, which is a continuous slot, is annular and is formed by the assembly of the component bearing parts 21 and 22, which make up the one bearing member 23, while the opposing bearing member 24 may comprise a single member. The bearing parts 21 and 22 are held in assembled relation by suitable fastening screws 24'. Again, the one bearing member 22 is formed so that it provides, on assembly with the component member 21, both the groove formation 20 and a supply passage 25. In this case, as in the case of FIGURES 3 and 4, the compressed gas is introduced into the film 26 between the parallel bearing surfaces adjacent and parallel to the periphery of the bearing so as to provide a large area of load-carrying film within the annular slot 20, which film is at essentially supply pressure when the film thickness approaches zero under heavy load.

Again, the $R_1$ restriction should be maintained substantially as described above in connection with the bearings of FIGURES 1 and 3.

Figure 7:
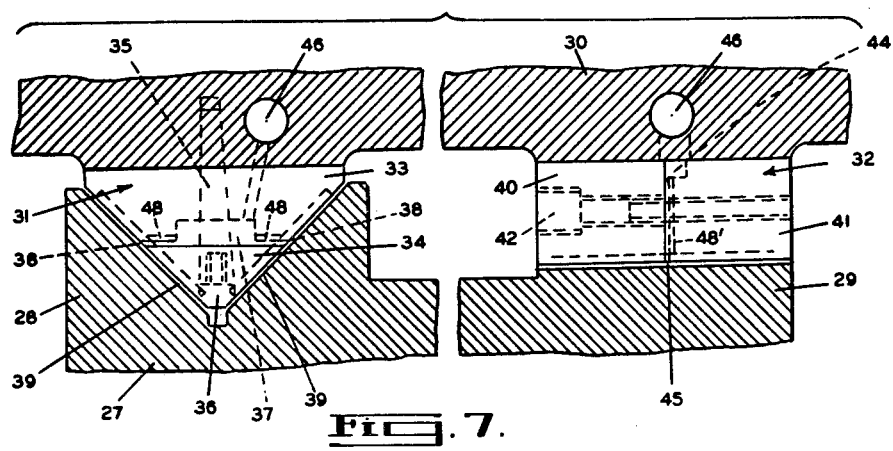
FIGURE 7 is a transverse, fragmentary vertical sectional view showing the application of the invention to the ways of, for instance, a grinding machine.
Figure 8:
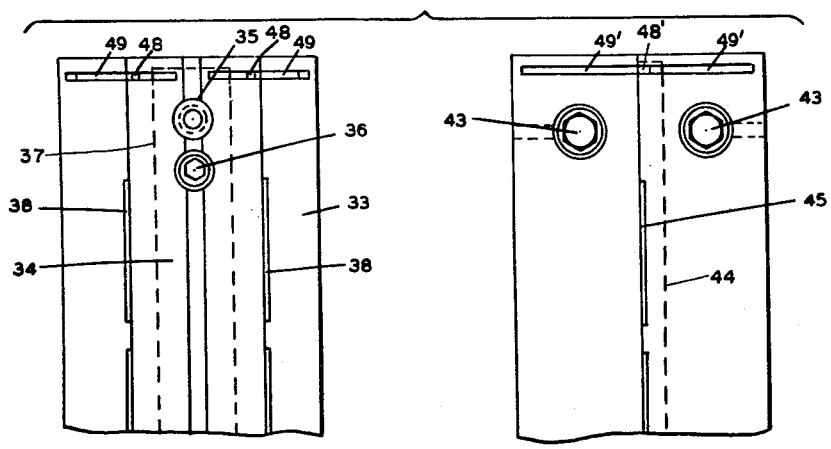
FIGURE 8 is a fragmentary underside plan view of the way members of the carriage of the machine of FIGURE 7.

FIGURES 7 and 8 illustrate a practical example where the bearing construction of FIGURES 1 and 2 may be successfully employed to provide important advantages in the accuracy of machine operation. In these figures, the numeral 27 represents the bed of a machine having a V way 28 and a flat way 29. The carriage 30 of the machine has way members generally designated at 31 and 32 for operating along the machine ways 28 and 29. The way member 31 is formed of component members 33, and 34, which are precisely related to the carriage 30 by tapered pins 35 which have threaded holes in their outer ends for their extraction.

Countersunk socket head screws 36 hold the precisely ground way components or pieces 33 and 34 to the carriage and seal supply channel 37 defined between the way components. The way components are formed to present on assembly with the carriage linear slot formations 38, extending longitudinally of and disposed centrally between the edges of the opposing faces 39 of the V way 28.

The way member 32 comprises the component way members or pieces 40 and 41, which pieces have their top and bottom surfaces ground percisely parallel so that their sideways position need not be precise.

Countersunk socket head screws 42 hold the way members 40 and 41 together, and similar screws 43 hold the members to the carriage 30. The component way members 40 and 41 are formed to provide on assembly with the carriage a supply channel 44 from which leads a slot formation 45 extending centrally and longitudinally of the flat way 29 to deliver compressed gas from the channel 44 to between the carriage way member 32 and the way 29. Suitable supply passages 46 may be formed in the carriage 30 for supplying compressed gas to the respective supply channels 37 and 44.

In this particular application of the invention, pressure gas from the channels 37 and 44 is also distributed through large openings 48 and 48' to large grooves 49 and 49' in the way members 31 and 32 respectively, so as to maintain supply pressure in the grooves regardless of bearing loads so that gas pressure vibration at this point is not possible. This pressure gas escapes out both ends of the way surfaces to exclude dust and dirt from the film spaces when the bearing is in motion.

Figure 10:
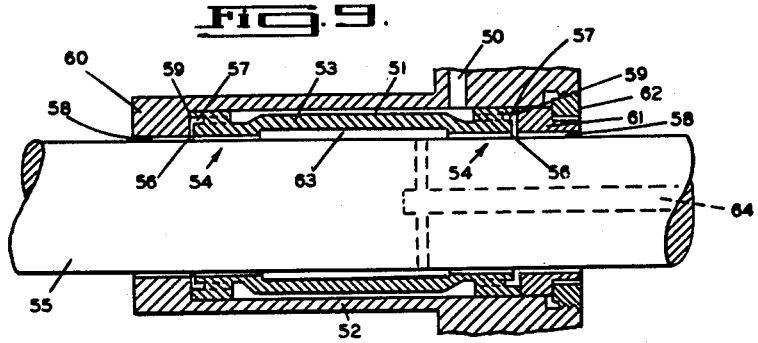
FIGURE 10 is a mid-vertical sectional view of another form of spindle bearing embodying the invention.

Another application of the bearing construction of FIGURES 1 and 2 is shown in FIGURE 10 which discloses a slot type gas spindle bearing suitable for high speed frictionless rotation. In this bearing, pressure gas is supplied through bore 50 to the annular space 51 between bearing housing member 52 and liner 53. The annular passageway 51 distributes the pressure gas to the spaced bearings designated at 54 which support shaft 55, the bearings 54 being constituted by the housing 52 and liner 53 which, in assembled relation, define at each bearing a restriction $R_1$ in the form of an annular slot 56 leading from an annular supply channel 57, in communication with the annular passageway 51, to the film 58 formed between the bearings 54 and shaft 55 under bearing operation.

The slots 56 thus regulate and distribute pressure air to the two lubricating films 58 in accordance with the slot dimensions. The actual slot thickness is controlled by the very slight but uniform protrusion of lips 59 on the ends of the liner 53 which engage respectively a reduced end 60 of the housing and a ring 61 introduced into the opposite end of the housing and engaged by a threaded ring 62. As the ring 62 is threaded into the housing and tightened, the slot thicknesses are accurately determined.

It will be appreciated that half of the air flowing through each of the slots 56 will be fed to the space 63 between the bearings 54, and this will be conducted away by a passage formation indicated at 64 in the shaft 55.

Figure 9:
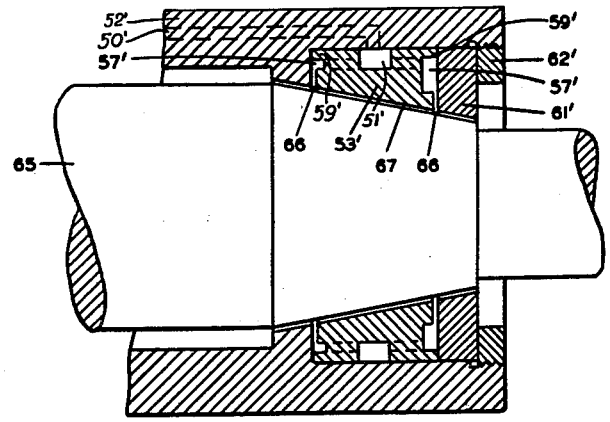
FIGURE 9 is a mid-vertical sectional view of one form of spindle bearing embodying the invention.

The bearing of FIGURE 9 is similar to the bearing of FIGURE 10, except that it is tapered in accordance with the taper of the spindle 65 operating in the bearing, and a pair of annular slots 66 adjacent to the edges of the bearing are provided in place of the central slot 56 at each of the bearings at the ends of the housing 52 in the bearing construction of FIGURE 10. Thus, in the same way, the bearing of FIGURE 9 is formed of a housing member 52' and a liner 53' corresponding to the like members of FIGURE 10. The liner 53 is held in position by ring 61' engaged by threaded ring 62'. Ring 61' engages lips 59' on the liner and pressure on the liner exerted through the rings controls the thickness of the slots 66 defined between the liner, housing and ring 61.

In addition, the liner is formed to provide the distributing channels 57' in communication with annular space 51', to which compressed gas is led through passage 50'. The provision of the two slots 66 provides peripheral feed adjacent opposite edges of the bearing so that a large area of load-carrying film 67, at essentially supply pressure when the film thickness approaches zero under heavy load, is afforded between the slots to provide increased load capacity over the central uniform linear compressed gas feed afforded by the slots 56 in the bearing of FIGURE 10.

Figure 11:
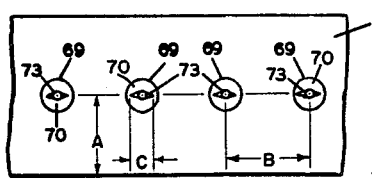
FIGURE 11 is a broken away underside plan view of a bearing member constructed in accordance with a further embodiment of the invention to be essentially equivalent to the bearing member of FIGURE 2.

FIGURE 11 illustrates an alternative form of bearing member which affords central uniform linear feed substantially equivalent to the feed afforded through the bearing member 1 of FIGURES 1 and 2. In this case, the bearing member 68 has a centrally aligned row of bores 69 therein, in each of which is inserted a brass plug 70 formed with a large bore 71, a central fine bore 72, and a slot formation 73. The relationships are such that the spacing between the centers of the plugs 70, B, is two-thirds of the distance from one edge of the bearing to the central line of the bearing, A. The fine bore or orifice 72 forms a restriction leading from the large bore 71, which is adapted to be connected to a source of compressed gas and forms a flow restricting orifice leading into the slots or grooves 73 which distribute the compressed gas flowing through the restriction 72 to the film.

The volume of gas which can be stored in the slot formation 73 must be limited in accordance with the requirements of United States Patent No. 2,683,635. With this arrangement, the plug 70 forms a separable component of the bearing 68, and the bearing is completed by the assembly of the components to provide the flow restriction as in the case of the bearings of FIGURES 1 to 10.

Figure 12:
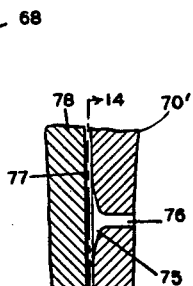
FIGURE 12 is an enlarged fragmentary vertical sectional view taken centrally through the bearing member of FIGURE 11 to illustrate the gas distribution passage formation.

With the bearing of FIGURES 11 and 12, the restriction 72 again has the limitation placed thereon that it must limit film thickness sufficiently so that the fluid friction of the gas flowing in the lubricating film will be greater than the vibration energy generated by flow of the gas through the film. It has been found that with this particular type of bearing, film thickness at half load is preferably to be maintained slightly thinner than in the case of the bearings of FIGURES 1 and 3 and a satisfactory film thickness at half load is $5.0 \times 10^{-4}$ inches with a maximum film thickness of approximately $9.0 \times 10^{-4}$ inches. A typical bearing of the type of FIGURES 11 and 12 is one in which the length C of the distributing grooves for a one inch wide bearing operating at 60 pounds per square inch supply pressure and consequent gas expansion ratio of 1 to 5 is .082 inch, so that flow section of film entry is one-quarter of flow section at film exit. With this arrangement the satisfactory groove width is $5.5 \times 10^{-3}$ inches and groove depth at peak is $10^{-3}$ inch with a diameter of the bore 72 being $5 \times 10^{-3}$ inch.

Alternatively to providing a groove in the plugs or bushings 70, bushings 70' aligned in the same manner as the bushings 70 in a bearing member 74 may be provided, and these bushings may have a contour formation 75 leading from a bore 76 which may either be an orifice or a capillary tube to distribute compressed gas to film 77 between the bearing member 74 and the opposing bearing member 78. Again, the contour 75 will be such as to limit the volume of compressed gas in communication with the film sufficiently to prevent vibration due to gas storage in accordance with the teachings of United States Patent Number 2,683,635.

In the bearings of FIGURES 1 to 10, the slot formation in each instance forms a fixed restriction leading to the film and has the limitations on this restriction $R_{1s}$ as above explained. In the contoured bearing of FIGURES 13 and 14 the point of maximum essentially fixed restriction $R_1$ may be either in the feed hole, e.g. bore 76, or at and in the entrance to the distributing contour 75, or in the case of the bearing of FIGURES 11 and 12, groove or slot 73.

The resistance to flow through the restriction $R_1$ in the contour type bearing multiplied by the bearing perimeter $p$ provides the $R_{1c}$ restriction factor as follows:

$$R_{1c} = \frac{p}{A}$$

where A is the total flow section at the above restriction or restrictions within the above perimeter (not a thin section).

The following Table I designates the desired limits of film thickness and flow resistance for desired vibration free operation of the different bearings discussed:

TABLE I

*Table of preferred operating values and limits of $R_1$ restriction and film thickness*

Figures 13, 14:
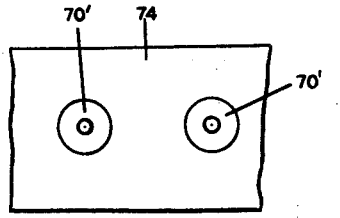
FIGURE 13 is a fragmentary vertical sectional view of a bearing incorporating a gas distributing contour formation in accordance with the said United States Patent No. 2,683,635.
FIGURE 14 is a view on the line 14—14 of FIGURE 13, illustrating the arrangement of such gas flow contours to provide gas distribution in accordance with the present invention.

| Examples of linear distribution | Preferred operating values | |
|---|---|---|
| | $R_1$ restriction | Half load film thickness |
| Slot, figs. 1 to 10 | $R_{1s}=10^9$ or more | $8 \times 10^{-4}$ or less. |
| Grooves, figs. 11 and 12 | $R_{1c}=5 \times 10^4$ or more. | $5 \times 10^{-4}$ or less. |
| Radiating contours, figs. 13 and 14 | $R_{1c}=1.2 \times 10^4$ or more. | $5 \times 10^{-4}$ or less. |

| Examples of linear distribution | Limits | |
|---|---|---|
| | Minimum $R_1$ restriction | Maximum half load film thickness |
| Slot, figs. 1 to 10 | $R_{1s}=2 \times 10^7$ | $1.6 \times 10^{-3}$. |
| Grooves, figs. 11 and 12 | $R_{1c}=9 \times 10^3$ | $9 \times 10^{-4}$. |
| Radiating contours, figs. 13 and 14. | $R_{1c}=1.2 \times 10^3$ | $9 \times 10^{-4}$. |

NOTE.—All dimensions are in inches.

It will be understood that deviations from the figures on vibration limits given in Table I may be caused by a number of factors. For instance, gas density, that is, the temperature, pressure and nature of the gas supplied to the bearing will affect the vibration limits. Density generally increases bearing vibration tendency.

Also, external damping or an external source of vibration energy may decrease or increase bearing vibration respectively.

Also where the air is delivered through a capillary passage as opposed to an orifice the diameter of the passage will be required to be increased to maintain film thickness.

In way bearings, such as described in connection with FIGURES 7 and 8, bearing widths may be varied without changing the perimeter, and will have some effect on vibration tendency. Similarly, the length of flow path in peripheral feed bearings is a vibration factor, especially if the path is very short.

Also, it may happen that the gas in the supply passage upstream from the $R_1$ restriction may resonate with the film thereby increasing bearing vibration energy.

In the slot bearings described in connection with FIGURES 1 to 10, it is highly desirable that the corners where the slot meets the bearing surface be rounded but these radii should be no greater than the slot thickness so as to avoid a vibration volume. The rounding of the corners assists in reducing gas vibration, smoothing the distribution of the gas into the film.

While all of the bearings disclosed are formed of separable components facilitating manufacture, it is to be particularly noted in connection with the slot bearings that the slot is in each case formed by the assembly of component bearing members such as the bearing members 2 and 3 in the bearing construction of FIGURE 1. Thus the slot is readily disassembled, which is essential for practical manufacture. This will be appreciated when the thinness of the slot is considered.

In production, the bearing members 2 and 3 will be assembled, and their bearing surface opposing the opposite bearing member 4 may be ground to provide the requisite surface flatness and accuracy. The grinding of the bearing surface will produce a burr that will at least partially block the slot, and the bearing members can be readily taken apart to remove this burr from the slot to provide the accurate slot dimension.

Also, in the case of plugging of the slot due to dirt from the compressed gas supply, the bearing members 2 and 3 can be quickly separated for cleaning to facilitate maintenance of bearing operation.

In the same way, the other bearings disclosed can be disassembled for maintenance without affecting the entire bearing surface, and in connection with the slot bearings of FIGURES 1 to 10, the slot can be taken apart for cleaning as above described.

It will be understood that while certain embodiments of the invention have been disclosed by way of illustration, such embodiments are for illustration purposes only, and are not intended to limit the scope of the appended claims.

What I claim as my invention is:

1. In a gas bearing comprising a pair of relatively movable bearing members separated by a lubricating gas film, a restricted gas flow passage formation leading through one of said members to between said members to supply pressure gas to a gas film separating said members, said gas flow passage formation being arranged and dimensioned to restrict pressure gas flow to between the bearing members to limit film thickness under half bearing load to a maximum thickness of from approximately $9.0 \times 10^{-4}$ to $1.6 \times 10^{-3}$ inches to prevent bearing vibration.

2. In a gas bearing comprising a pair of relatively movable bearing members separated by a lubricating gas film, a restricted gas flow passage formation leading through one of said members to between said members to supply pressure gas to a gas film separating said members, said gas flow passage comprising a slot formation arranged and dimensioned to limit film thickness under half bearing load to a maximum of approximately $1.6 \times 10^{-3}$ inches.

3. A gas bearing as claimed in claim 2 in which the length of said slot in the direction of gas flow $x$ divided by the thickness of the slot $t_s$ is greater than 50.

4. A gas bearing as claimed in claim 2 in which said slot formation affords a restriction $R_{1s}$ having a minimum value of approximately $2 \times 10^7$.

5. In a gas bearing comprising a pair of relatively movable bearing members separated by a lubricating gas film, a restricted gas flow passage formation leading through one of said members to between said members to supply pressure gas to a gas film separating said members, said restricted gas flow passage formation comprising fine bore means leading to diverging distribution passage means entering to the film and arranged and dimensioned to limit film thickness under half bearing load to a maximum of approximately $9.0 \times 10^{-4}$ inches.

6. A gas bearing as claimed in claim 5 in which said restricted gas flow passage affords a restriction $R_{1c}$ having a minimum value of approximately $1.2 \times 10^3$.

7. A gas bearing comprising a pair of relatively movable bearing members adapted to be separated by a thin lubricating gas film having spaced parallel edges forming outlet gas passage means varying in cross section with separation of said bearing members, one of said bearing members being formed by assembly of separable component parts which on assembly define a compressed gas supply passage and an inlet gas flow passage formation leading from said supply passage to between said bearing members, said inlet gas flow passage formation being disposed to supply gas to a film separating said bearing members at points substantially at least along one line parallel to said bearing edges, said gas inlet flow passage formation being dimensioned to restrict pressure gas flow to between the bearing to limit the thickness of the film under half bearing load to a maximum thickness of from substantially $9.0 \times 10^{-4}$ to $1.6 \times 10^{-3}$ inches to prevent bearing vibration.

8. A gas bearing comprising a pair of relatively movable bearing members presenting a pair of parallel bearing surfaces adapted to be separated by a thin lubricating gas film, one of said bearing members having a slot formation formed therein leading from a compressed gas supply passage to between said bearing surfaces, said slot formation having a minimum $R_{1s}$ substantially equal to $2 \times 10^7$.

References Cited by the Examiner
UNITED STATES PATENTS

| | | |
|---|---|---|
| 2,683,635 | 7/54 | Wilcox. |
| 2,756,114 | 7/56 | Brunzel _____ 308—9 |
| 2,877,066 | 3/59 | Baumeister. |

FRANK SUSKO, *Primary Examiner.*